United States Patent [19]
Cook

[11] Patent Number: 5,517,165
[45] Date of Patent: May 14, 1996

[54] SWITCH MECHANISM

[75] Inventor: David L. Cook, Rangiora, New Zealand

[73] Assignee: PDL Holdings Limited, Christchurch, New Zealand

[21] Appl. No.: 202,952

[22] Filed: Feb. 28, 1994

Related U.S. Application Data

[63] Continuation-in-part of Ser. No. 917,862, Jul. 21, 1992.

[30] Foreign Application Priority Data

Jul. 22, 1991 [NZ] New Zealand ............................ 239076
Apr. 15, 1992 [NZ] New Zealand ............................ 242376

[51] Int. Cl.$^6$ ................................................. H01H 73/00
[52] U.S. Cl. ................................................. 335/18; 361/42
[58] Field of Search ........................... 335/18; 361/42–50

[56] References Cited

U.S. PATENT DOCUMENTS 4,010,432  3/1977  Klein .
4,197,567  4/1980  Dietz .
4,719,437  1/1988  Yun ............................................. 335/18
4,851,951  7/1989  Foster, Jr. .................................. 361/50
5,223,810  6/1993  Van Haaren .............................. 335/18

FOREIGN PATENT DOCUMENTS 0189493  11/1994  European Pat. Off. .

Primary Examiner—Lincoln Donovan
Attorney, Agent, or Firm—Ladas & Parry

[57] ABSTRACT

A switch mechanism opens a contact set in the event of an electrical fault condition. The mechanism involves a contact lever biased by a spring for pivoting about one or other of two fulcrums to open or close the contacts respectively. The fault condition results in an out of balance current flow which causes a solenoid to release a plunger initiating operation about a fixed fulcrum to open the contacts. A reset device is used manually to initiate operation about a movable fulcrum to reclose the contact set, provided the fault condition has been removed. An arm is deflected by the plunger to shift the movable fulcrum and also acts to restore the plunger as the mechanism is tripped. The switch mechanism may be incorporated in a residual current device (ground fault circuit interrupter) which provides a detection circuit to trip the mechanism.

18 Claims, 12 Drawing Sheets

5,517,165

SWITCH MECHANISM

This is a continuation-in-part of application Ser. No. 07/917,862 filed on Jul. 21, 1992.

BACKGROUND OF THE INVENTION

This invention relates to a switch mechanism and more particularly to a residual current device incorporating the mechanism. In the United States such devices are commonly referred to as ground fault circuit interrupter (GFCI) and are intended to be encompassed here after by the notation (RCD).

An RCD is a safety device which cuts power to an electrical appliance or other load in the event of certain faults. The device senses current imbalance between active and neutral power conductors resulting from earth currents created by the faults. A differential transformer generates an out of balance signal which is electronically amplified and compared with a predetermined threshold. Exceeding the threshold trips a switch mechanism and opens a contact set to cut the power. Several switch mechanisms are known but most are expensive to manufacture or bulky or otherwise less suitable for general use.

Switches having a lever assembly which pivots about one or other of two fulcrums to open or close the contact set as in the present invention are disclosed in U.S. Pat. No. 4,010,431 Virani et-al, U.S. Pat. No. 4,034,266 Virani et-al, and U.S. Pat. No. 4,209,762 Samborski et-al. Reset is achieved in these cases however by pushing down on the close fulcrum rather than on the lever. In U.S. Pat. No. 3,813,579 Doyle et-al, a reset device pushes on the lever but also provides the open fulcrum rather than having independent pivot and reset action. In all of these cases a solenoid is energised to expel a plunger and trip the switch rather than being de-energised to simply release the plunger under bias from a spring. U.S. Pat. No. 4,567,456 Legatti, discloses a simple plunger release but there is no double pivoting action of a lever and the solenoid is required to maintain bending of a flexible arm. In each known case the plunger is also restored by the solenoid itself or on reset, rather than almost immediately after release during pivoting of the lever.

SUMMARY OF THE INVENTION

It is an object of the present invention to provide a cheaper and/or more compact switch mechanism for RCDs or at least to provide the public with a useful choice.

Accordingly the invention provides a mechanism for an RCD having several improved features. The mechanism may be used in either an undervoltage or shunt trip arrangement. A contact lever or carrier is biased to operate about one or other of a fixed or a moveable fulcrum when opening or closing a contact set. Detection of an electrical fault condition causes a solenoid to eject a plunger which initiates the opening action about the fixed fulcrum, while a manual reset means initiates operation about the moveable fulcrum during the closing action. An arm is deflected by the plunger to shift the moveable fulcrum as the contacts open. The arm also acts to restore the plunger. Should the contacts become tack welded together the reset means may be used to apply an increasing manual force to break the contacts apart.

DESCRIPTION OF THE DRAWINGS

General principles of the invention and two preferred embodiments will be described with reference to the accompanying drawings of which.

DETAILED DESCRIPTION OF THE PREFERRED EMBODIMENT

Figure 18:
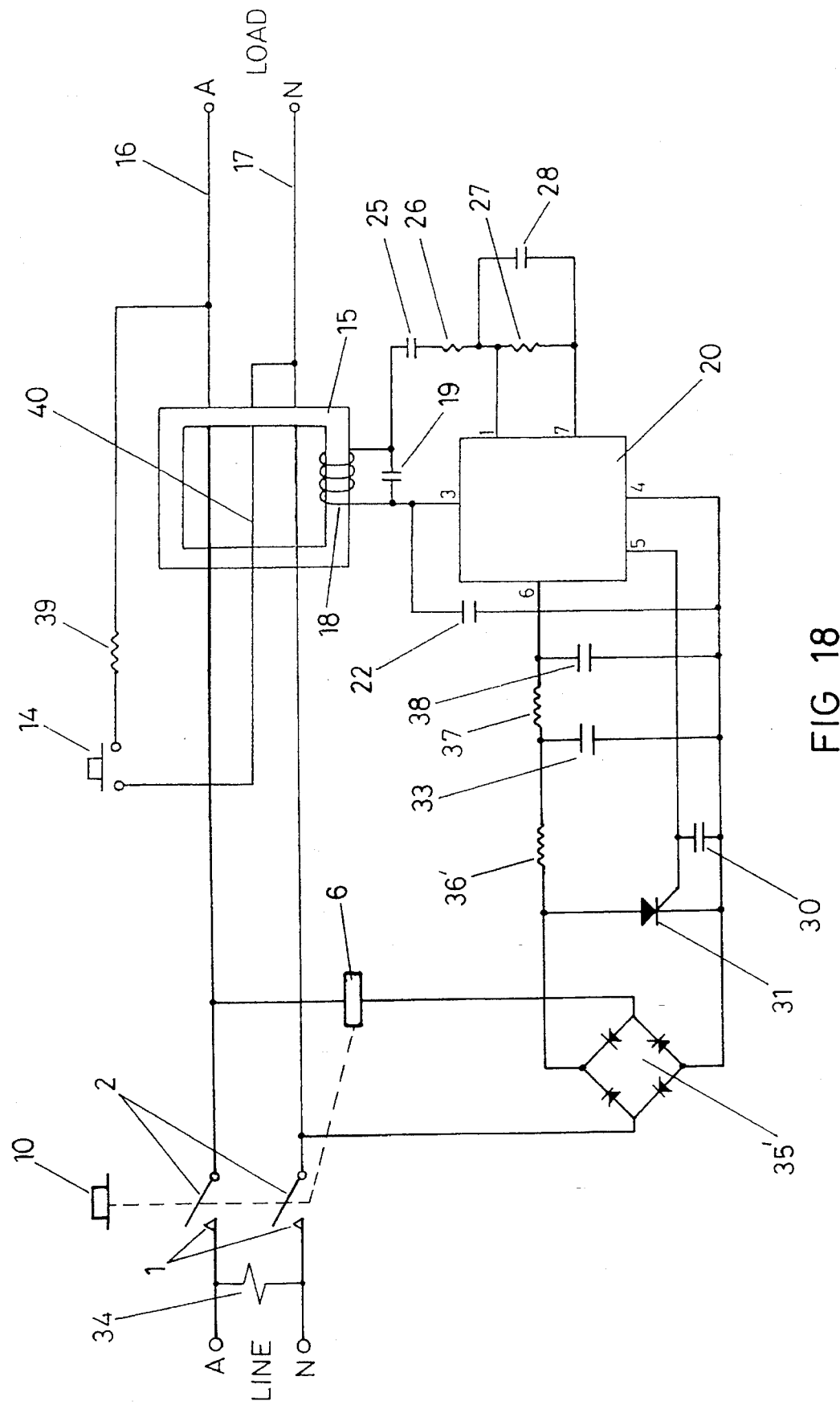
FIG. 18 is another example RCD circuit which may be used with a second preferred form of the switch mechanism.
Figure 19:
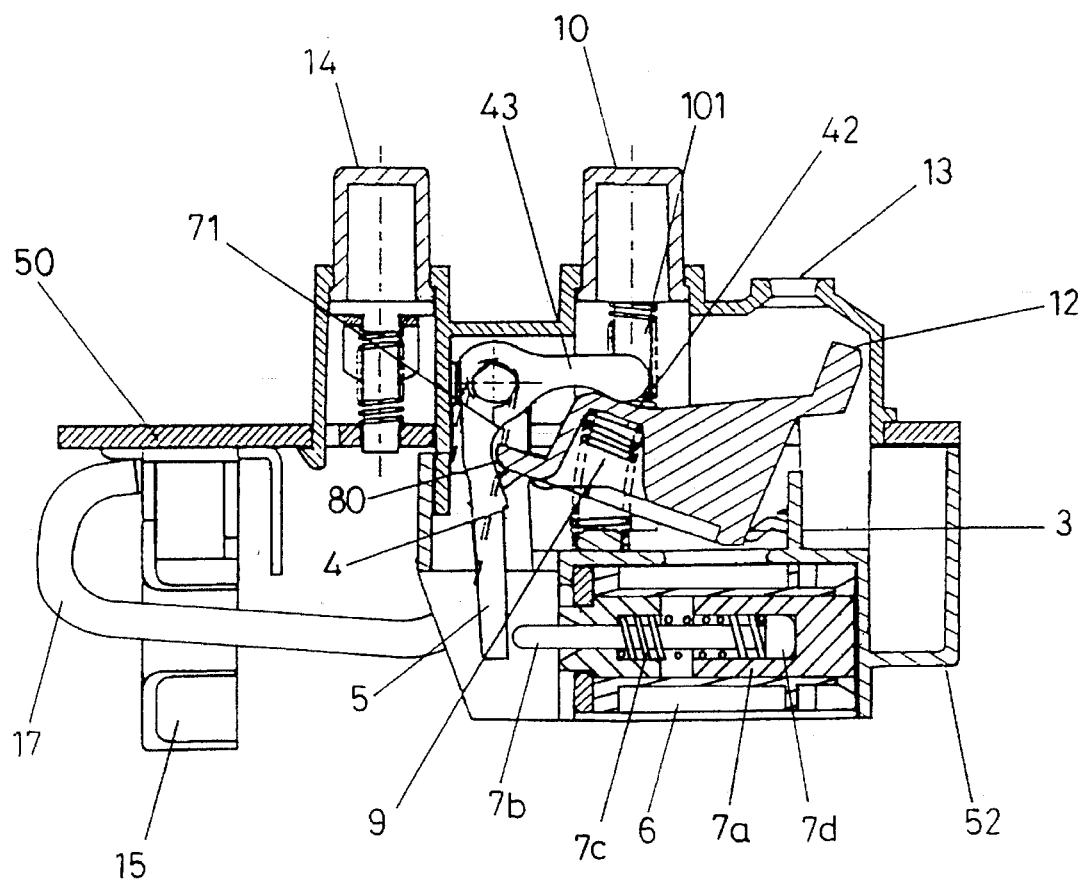
FIG. 19 is a side view of another preferred RCD.

Referring to these drawings, FIGS. 1 to 8 are intended to demonstrate the general principles of a switch mechanism according to the invention. FIGS. 9 to 17 shows one preferred embodiment (undervoltage) and FIGS. 18 and 19 shows another preferred embodiment (shunt trip) and how these two preferred embodiments of the mechanism may be incorporated in an RCD.

In the undervoltage embodiment the switch is normally open until mains power is applied and a manually operated reset device, such as a push button, has closed the contact set and provided power to a load. If mains power is removed or loss of supply neutral or if a control circuit detects an out of balance current flow, an electromechanical device such as a solenoid trips a lever assembly and the contacts open.

In the shunt trip embodiment the switch is closed by manual reset such as a push button and remains closed until either a test button is operated to simulate an earth fault or if the circuit detects an out of balance current flow and again an electromechanical device such as a solenoid trip the lever assembly and the contacts open.

In the first embodiment the solenoid is energised under a normal no fault condition and is de-energised to release a plunger when an out of balance current is detected. In the second embodiment the solenoid is normally de-energised and is only briefly energised to eject the plunger when an out of balance current is detected.

As shown in FIGS. 1 to 6, the contact set comprises a fixed contact I mounted on an appropriate support and a movable contact 2 mounted on a contact lever or contact carrier 3. The lever or carrier 3 is able to pivot about either of a first fulcrum position 4 on swing arm 5 or a second fulcrum position 8 on the support. Spring 9 provides a force on the lever between the fulcrums and causes the pivoting when required to open or close the contacts 1 and 2.

In the first embodiment a sufficient voltage applied to solenoid 6 holds plunger 7 against a bias spring from acting on arm 5. Under a fault condition the plunger is released and the biasing force of the spring extends the plunger to engage lever 5 and disengage fulcrum 4 from lever or carrier 3 which then pivots about fulcrum 8 under action of spring 9.

In the second embodiment the plunger assembly is normally held in with the plunger 7a operating within the solenoid to extend or push out a pin 7b in the known manner. The plunger 7a and the pin 7b are held in a retracted position by a spring 7c. A fault condition causes the solenoid 6 to move the plunger 7a and pin 7b against the spring 7c so that the pin 7b engages the arm 5 with the same effect as in the first embodiment.

Button 10 is mounted on the support and pushes on lever or carrier 3 through shaft 101 to move the lever or carrier 3 away from fulcrum 8 and to a position to engage with fulcrum 4 in resetting the mechanism.

Arms 42 and 43 extend from lever or carrier 3 and arm 5 respectively, and interact to restore the plunger within the solenoid during pivoting of the lever about fulcrum 8 ie immediately following the tripping action.

Figure 1:
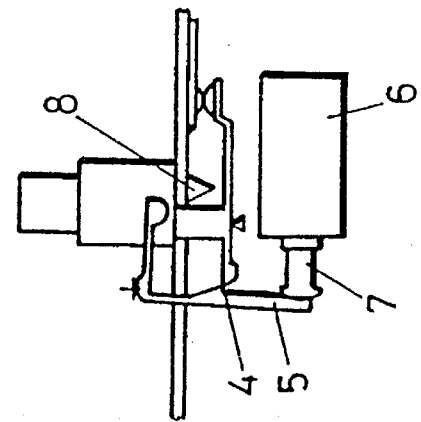
FIG. 1 is a diagrammatic representation of the switch mechanism with the contact set closed.

Referring to FIG. 1, the contact set 1 and 2 is shown closed in a no fault working condition of the switch. Spring 9 pushes one end of lever or carrier 3 against fulcrum 4 and at the other end contact 2 is pushed against contact 1. There is a clearance between lever or carrier 3 and fulcrum 8.

Figure 2:
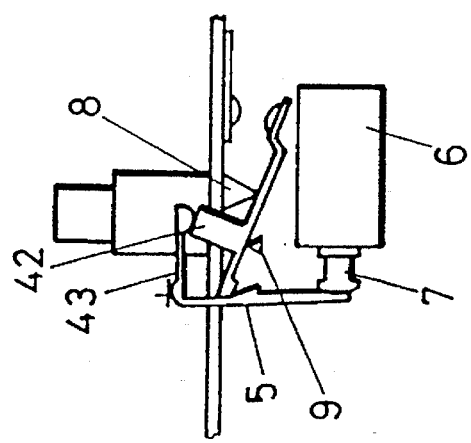
FIG. 2 shows the beginning of a trip release of the contact lever from the first fulcrum position.

Referring to FIG. 2, initial movement of the mechanism is shown on occurrence of a fault condition. The voltage across solenoid 6 has changed and plunger 7 is ejected to deflect swing arm 5. This disengages fulcrum 4 from lever or carrier 3.

Figure 3:
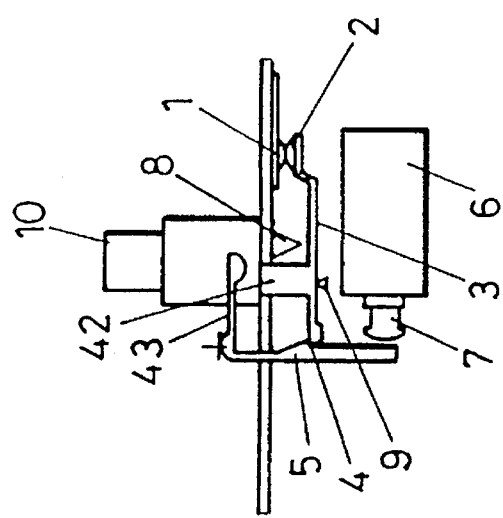
FIG. 3 shows movement of the lever to pivot about the second fulcrum position.

Continuing the movement as shown in FIG. 3 opens the contact set 1 and 2. Spring 9 pushes lever or carrier 3 towards fulcrum 8 about which it then pivots. This separates the contacts 1 and 2 breaking current to the load. Arms 42 and 43 have moved together.

Figure 4:
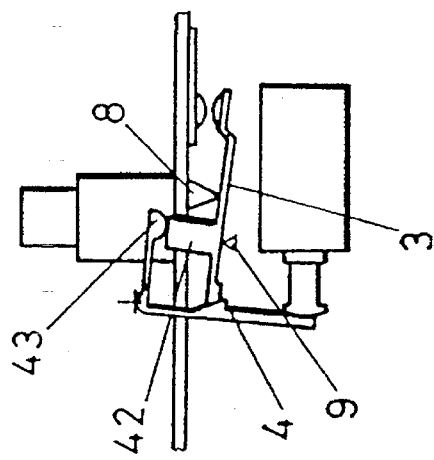
FIG. 4 shows the contact set open.

In FIG. 4, the contact set 1 and 2 is shown fully open. Lever or carrier 3 has pivoted to maximum about fulcrum 8. Arm 42 on lever or carrier 3 has pushed arm 43 on swing arm 5 past the position of FIG. 1 and restored plunger 7 within the solenoid 6.

This action reduces the size and cost of the solenoid required. In the first embodiment the plunger is pushed against the solenoid bias spring indirectly by spring 9. In the second embodiment the plunger assembly is retracted under the action of a strong internal spring but the arm 5 is still acted upon indirectly by spring 9 and could engage the plunger assembly to give an initial impetus to resetting or to overcome any impeding magnetism which may remain in the solenoid.

Figure 5:
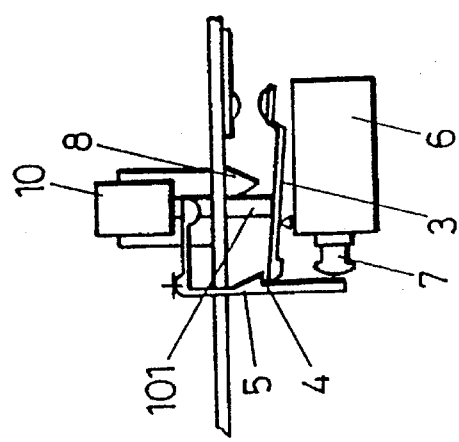
FIG. 5 shows a reset operation attempted under a fault condition.

Referring to FIG. 5, which relates to the first embodiment, a reset operation is shown attempted with the solenoid 6 de-energised. For example, there may be low mains voltage or an active or neutral open circuit on the line side of the contacts. Arm 42 is omitted for clarity. As button 10 reciprocates, shaft 101 pushes lever or carrier 3 away from fulcrum 8 against spring 9. Arm 42 is separated from arm 43 and plunger 7 is released under spring action from solenoid 6 deflecting swing arm 5 so that fulcrum 4 cannot engage the lever or carrier 3. This simply returns the mechanism to the state of FIG. 4 on releasing the button.

Figure 6:
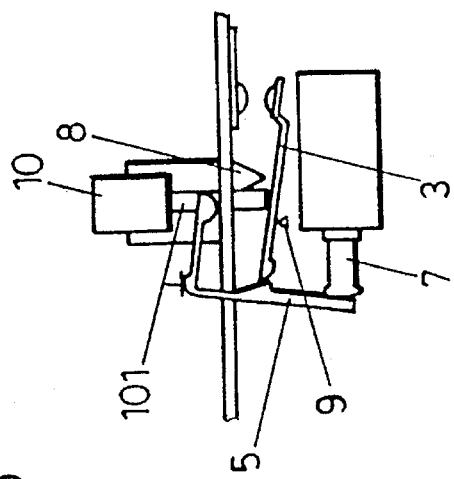
FIG. 6 shows the reset operation nearly complete.

In FIG. 6 a reset becomes possible as the solenoid 6 is energised by a normal voltage ie there is no fault condition. On pushing lever or carrier 3 away from fulcrum 8, plunger 7 now remains held in solenoid 6. The lever or carrier 3 slides over fulcrum 4 with swing arm 5 maintained in a position by a light biasing action to ensure their engagement. Pressure on button 10 is removed and spring 9 pushes lever or carrier 3 to engage fulcrum 4 at one end, followed by pivoting to close the contact set 1 and 2. This returns the mechanism to the state of FIG. 1. In an RCD in the first embodiment if a fault on the load side remains, the solenoid will be de-energised and the switch will immediately trip after resetting.

A reset operation in the second embodiment will be self evident in view of FIG. 6. The solenoid is always de-energised until the contacts are actually closed. If a fault is present once the action of FIG. 6 is completed, the pin 7b will simply be ejected achieving the same effect as in FIG. 3.

Figure 7:
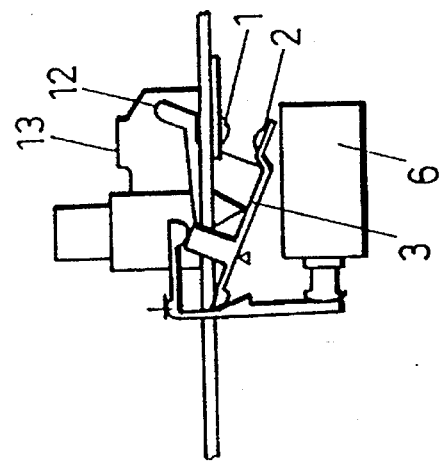
FIG. 7 shows the switch mechanism and an indicator with the contact set closed.
Figure 8:
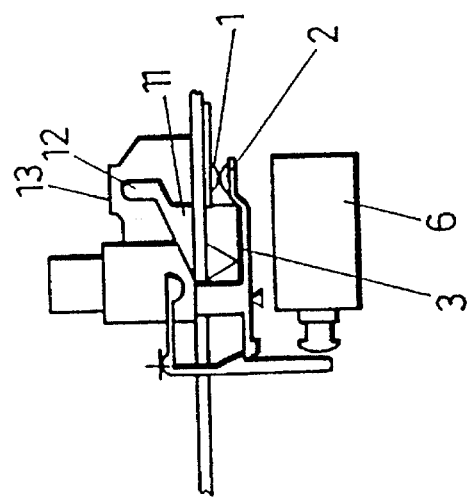
FIG. 8 shows the indicator of FIG. 7 with the contact set open.

FIGS. 7 and 8 show a means which indicates whether power is being supplied to the load. An arm 11 is mounted on lever or carrier 3 and carries a flag 12 which is visible in opening 13 when contacts 1 and 2 are closed. On a fault condition the lever or carrier 3 pivots to open the contacts and moves the flag 12 to a less visible position, making it apparent that the fault condition has occurred.

Figure 9:
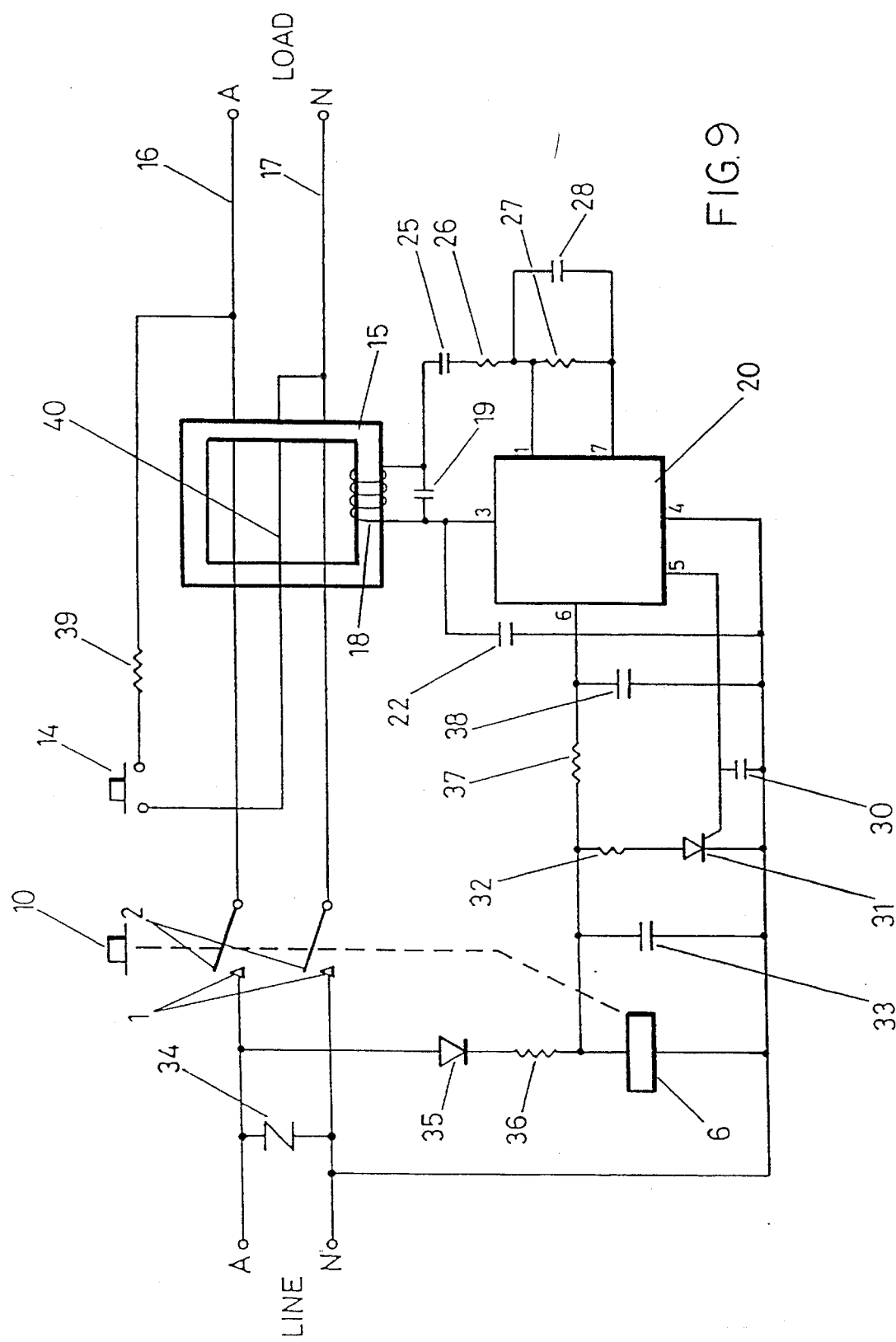
FIG. 9 is an example RCD circuit which may be used with a first preferred form of the switch mechanism.

FIG. 9 shows a first control circuit which could be used with the first embodiment switch mechanism of FIGS. 1 to 8 in an RCD. This is based on a Raytheon RV4145 ground fault interrupter integrated circuit 20. A differential toroidal transformer 15 has mains active and neutral conductors 16 and 17 passing centrally through a core over which is wound a secondary winding 18 of high inductance. The conductors are effectively anti-phased primary windings such that normal load currents cancel each other resulting in zero output voltage from the secondary winding. An output voltage is developed when a small residual current from the load active flows back to line neutral indirectly, usually via earth, from a faulty appliance or cable connected in the load.

A metal oxide varistor 34 is provided to limit peak mains transients from causing damage to the circuit or any attached appliance. Power is supplied to the circuit by a half wave rectifier 35 and current limiting resistor 36. Capacitor 33 is charged and applies a voltage to solenoid 6 which retains plunger 7 so that contacts 1, 2 can be closed. Action of the plunger in the switch mechanism is indicated by the dashed line. As IC 20 draws very little quiescent current, resistor 37 is used as a simple voltage dropper, with capacitor 38 provided as a precaution against electrical noise problems rather than as a supply filter.

One end of coil 18 is connected to IC 20 at pin 3 which is a common amplifier reference point. Capacitor 19 filters high frequency noise from the secondary voltage, while capacitor 22 provides noise bypassing from the bulk of the coil to IC 20 at ground pin 4. The active end of coil 18 is connected to an amplifier summing junction at pin 1 through capacitor 25 and resistor 26. Resistors 27 and 26 determine the amplifier gain while capacitor 25 series resonates with the coil inductance and is designed to extract mains frequency signal components from loads which use half wave power control. Otherwise the core would saturate from the resulting DC and produce very little output to trip the switch. Capacitor 28 provides amplifier high frequency roll off.

The amplifier output is internally connected to comparators which are referenced to zener diodes in IC 20. When the amplified signal detected on pin 1 exceeds the zener thresholds, an output signal at pin 5, filtered by a capacitor 30, triggers a silicon controlled rectifier 31. The SCR 31 latches via the current limiting resistor 32 and temporarily discharges capacitor 33 reducing the voltage across solenoid 6. This releases plunger 7 to cause opening of the contacts, turning off power to the load. Capacitor 33 then recharges to allow closing of the contacts in a reset operation.

A circuit test means is provided by which unbalanced current is passed through the transformer core to check action of the switch. Button 14 is pressed to complete a link between the active and neutral conductors, taking a portion of the active current determined by resistor 39 through the transformer. This simulates a residual current flowing from the live or active conductor and escaping to earth.

FIGS. 10 to 17 show a first preferred switch mechanism using the principles outlined with respect to FIGS. 1 to 8, incorporated in an RCD. Most of the circuit components outlined with respect to FIG. 9 have been omitted for clarity. The RCD structure is built around a printed circuit board 50 and plastics casing elements 51, 52 clipped together at 53, 54, 55. Using references as in FIGS. 1 to 8 the structure comprises two pairs of contacts 1 and 2, contact lever or carrier 3, first fulcrum means 4 on swing arm 5, solenoid 6 and plunger 7, second fulcrum means 8, lever or carrier 3 pivoting spring 9, reset means 10, extension arms 42 on lever or carrier 3 and an arm 43 extending from the top of arm 5, indicator arm 11, flag 12 and view opening 13. This structure also shows spring 70 which ejects plunger 7 from solenoid 6 and spring 71 which biases arm 5 to ensure proper latching of fulcrum 4 with lever or carrier 3.

Using references as in FIG. 9 the structure comprises differential transformer 15, live or active and neutral conductors 16, 17, test means 14 and test conductor 40. In fixing the RCD between mains and a load, the conductors are connected at terminals 60, 61 and 62, 63 respectively.

Figure 10:
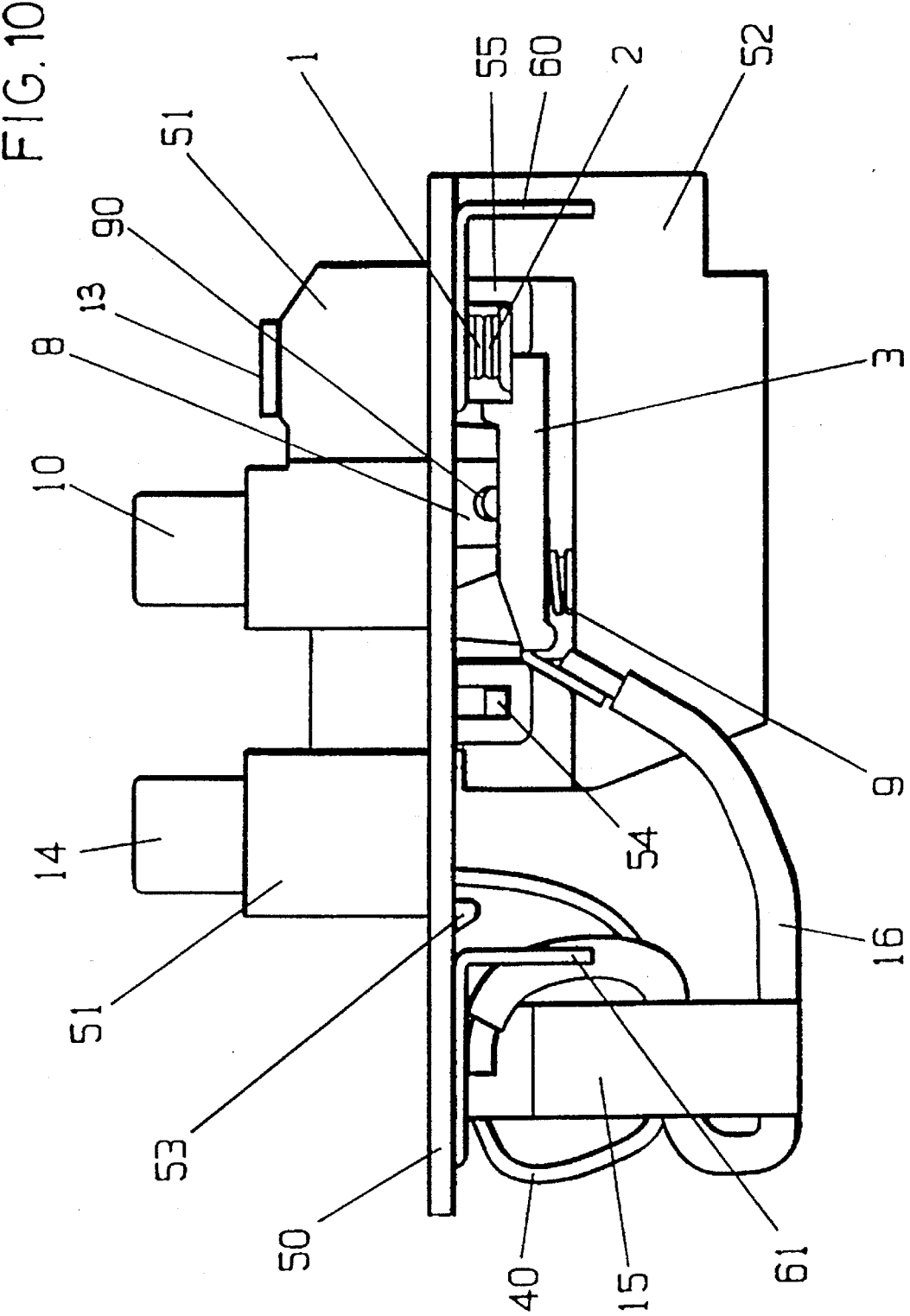
FIG. 10 is a side view of a preferred RCD with the contacts closed.
Figure 11:
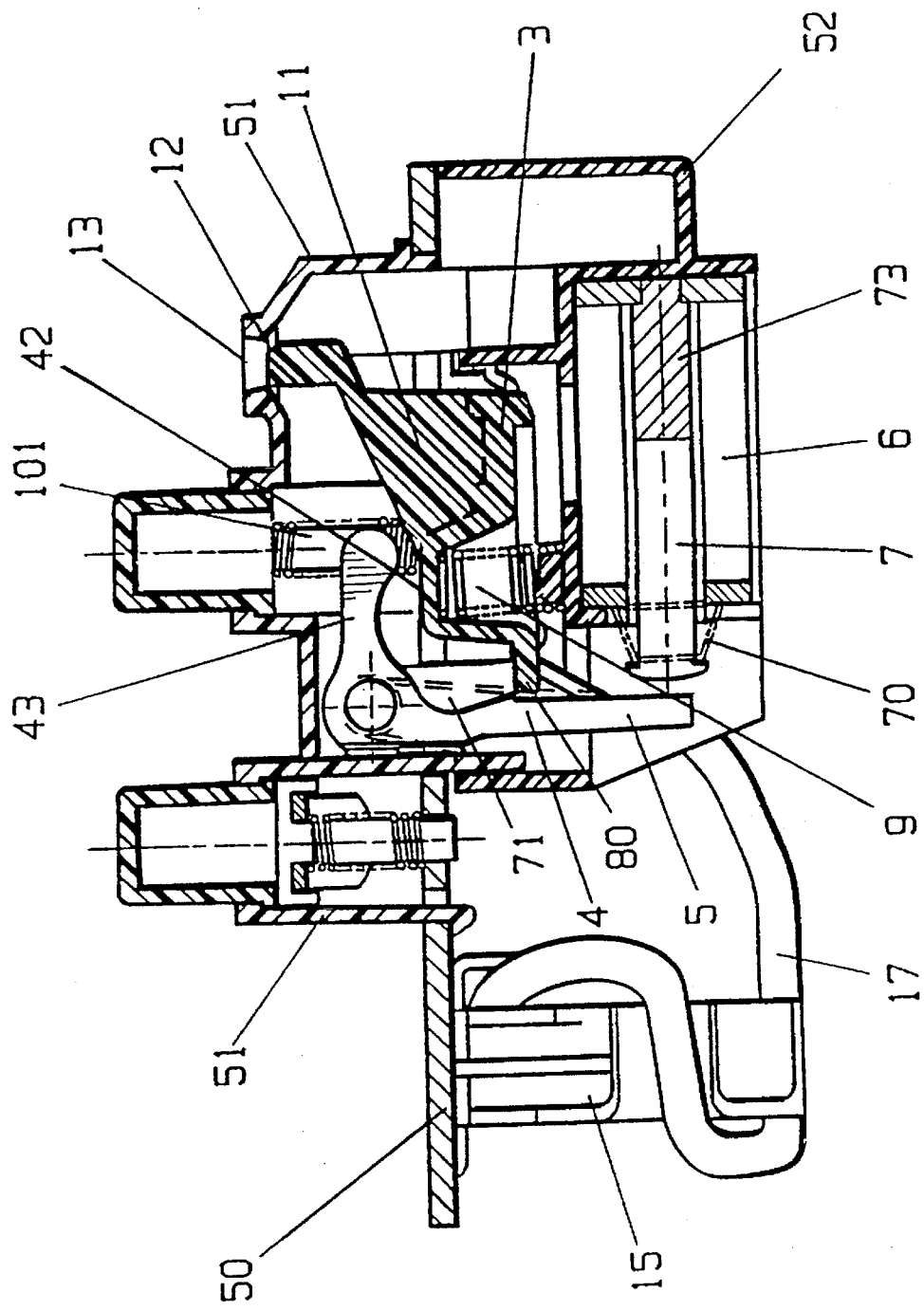
FIG. 11 is a section of the RCD in FIG. 10.

Referring to FIGS. 10 and 11 the RCD is shown with the contact pairs closed. The mains active line would be connected to terminal 60 so that current flows through contacts 1, 2, a plate 85 (shown in FIG. 17), conductor 16 and terminal 61, from there to the load. The mains neutral line and load are similarly connected on the other side of the device which appears identical. End or tongue 80 of the lever or carrier 3 is engaged by fulcrum 4 under force from spring 9. Fulcrum 8 has two slots 90 which loosely receive axles 81, 82 of the lever or carrier 3. Plunger 7 is held to block 73 within solenoid 6 against spring 70 by a voltage derived from the mains. Flag 12 is apparent in opening 13.

Figure 12:
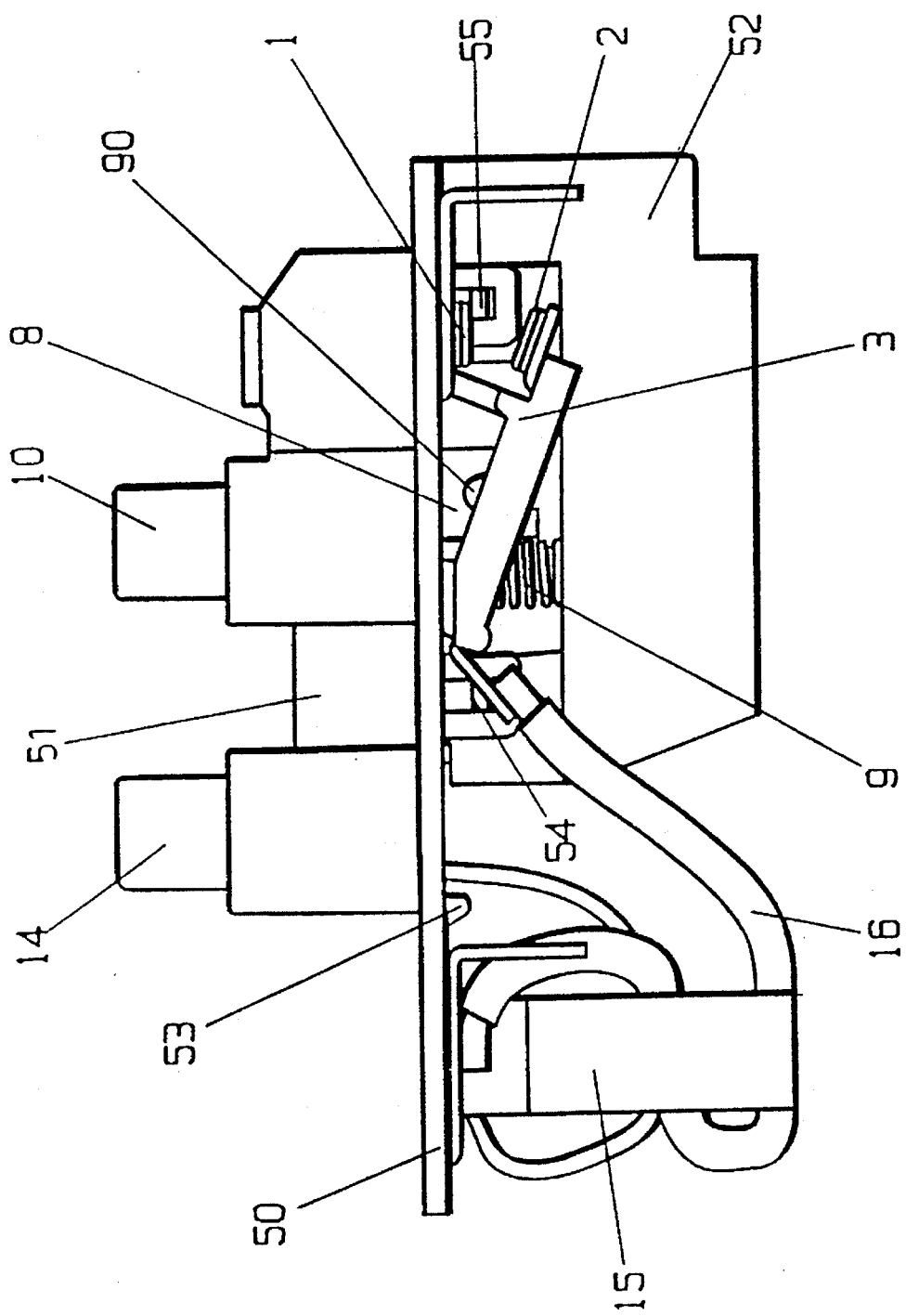
FIG. 12 is a side view of the preferred RCD with the contacts open.
Figure 13:
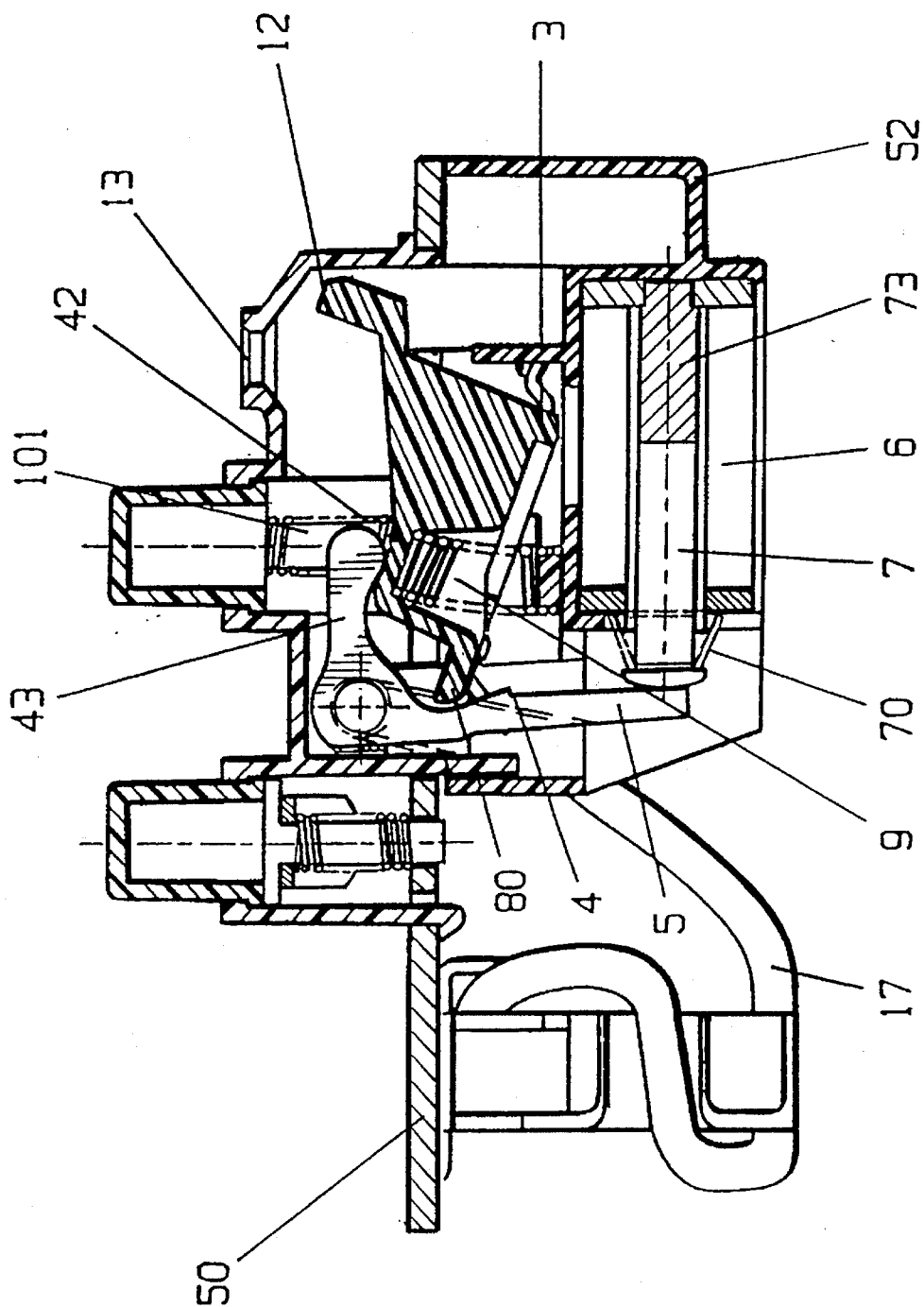
FIG. 13 is a section of the RCD in FIG. 12.

Referring to FIGS. 12 and 13 the RCD is shown tripped with the contact pairs open. Contacts 1 and 2 are separated to interrupt current flow to the load. End or tongue 80 of lever or carrier 3 has disengaged from fulcrum 4, and axles 81, 82 (shown in FIG. 17) are engaged in slots 90 on fulcrum 8 under force from spring 9. Plunger 7 was released to deflect arm 5 after de-energisation of the solenoid but is shown restored after action of extension 42 on extension 43. Flag 12 is no longer apparent through opening 13.

Figure 14:
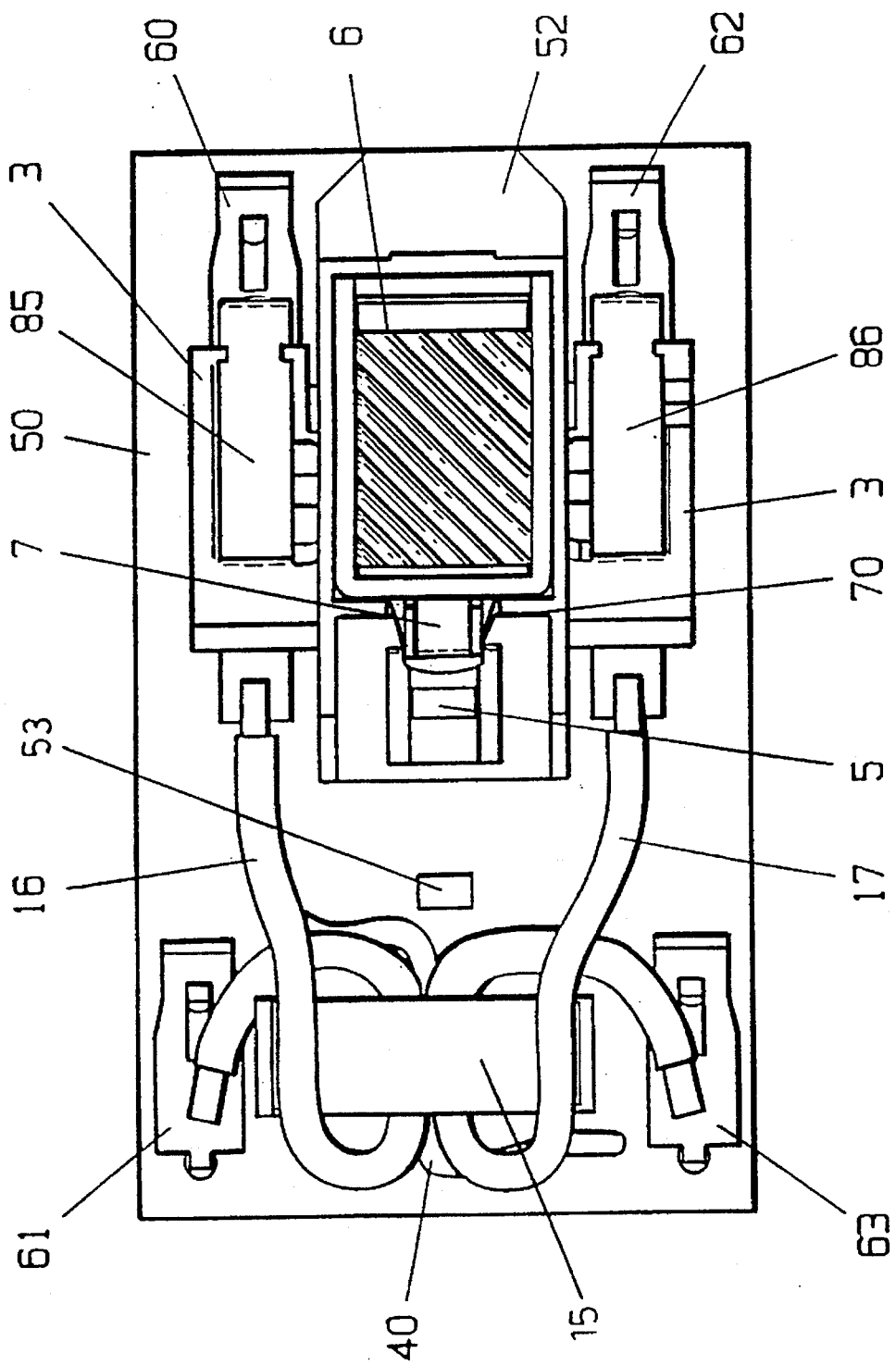
FIG. 14 is an underside view of the preferred RCD.
Figure 15:
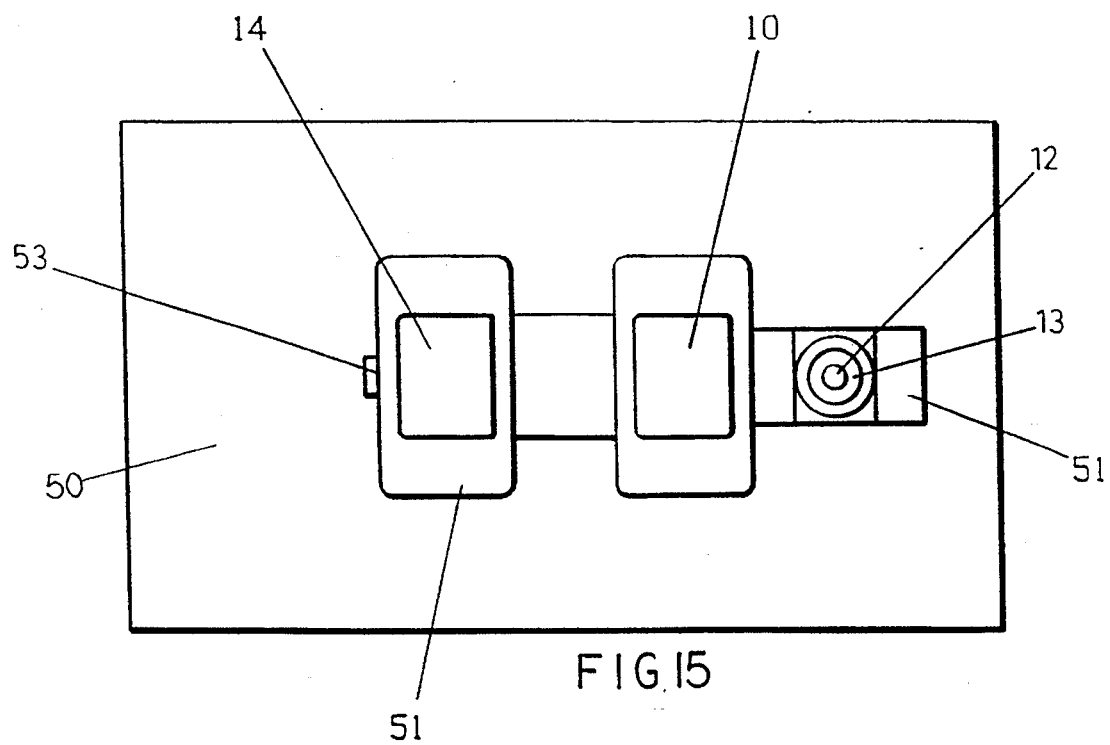
FIG. 15 is an overhead view of the preferred RCD.

Referring to FIGS. 14 and 15 the RCD underside and topside are shown as they appear with the contacts closed. Current passes through terminals 60, 62, plates 85, 86 on lever 3, conductors 16, 17 and terminals 61, 63 as can be seen. Solenoid 6 is energised to hold plunger 7. Flag 12 is apparent through opening 13.

Figure 16:
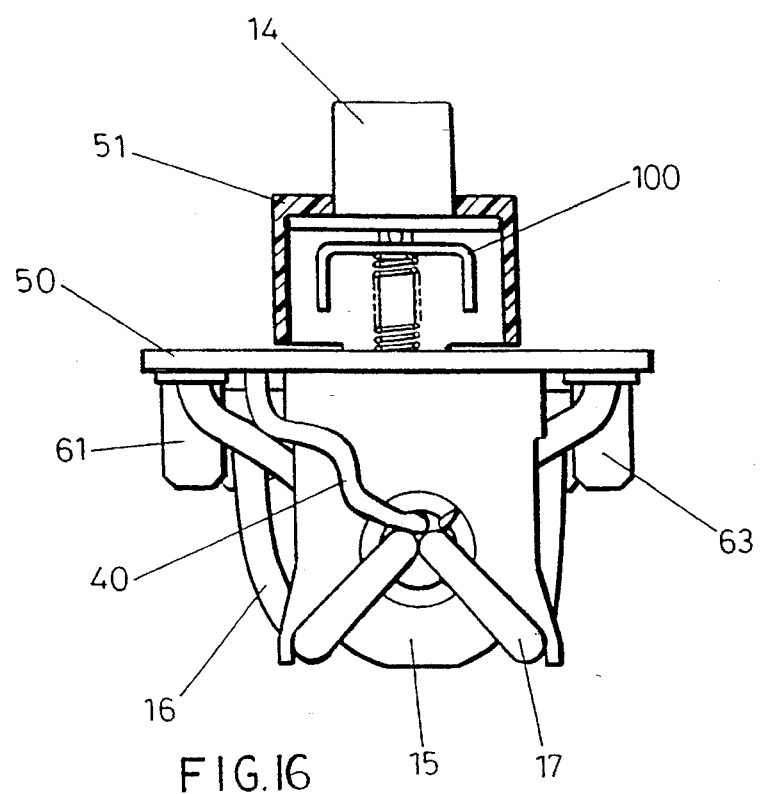
FIG. 16 is an end view of the preferred RCD.

Referring to FIG. 16 an end view of the RCD shows conductors 16, 17 passing through differential transformer 15, and also an inside view of test button 14. Pushing the button takes a predetermined portion of mains current across contact bar 100 and along conductor 40 through the transformer to simulate a fault condition.

Figure 17:
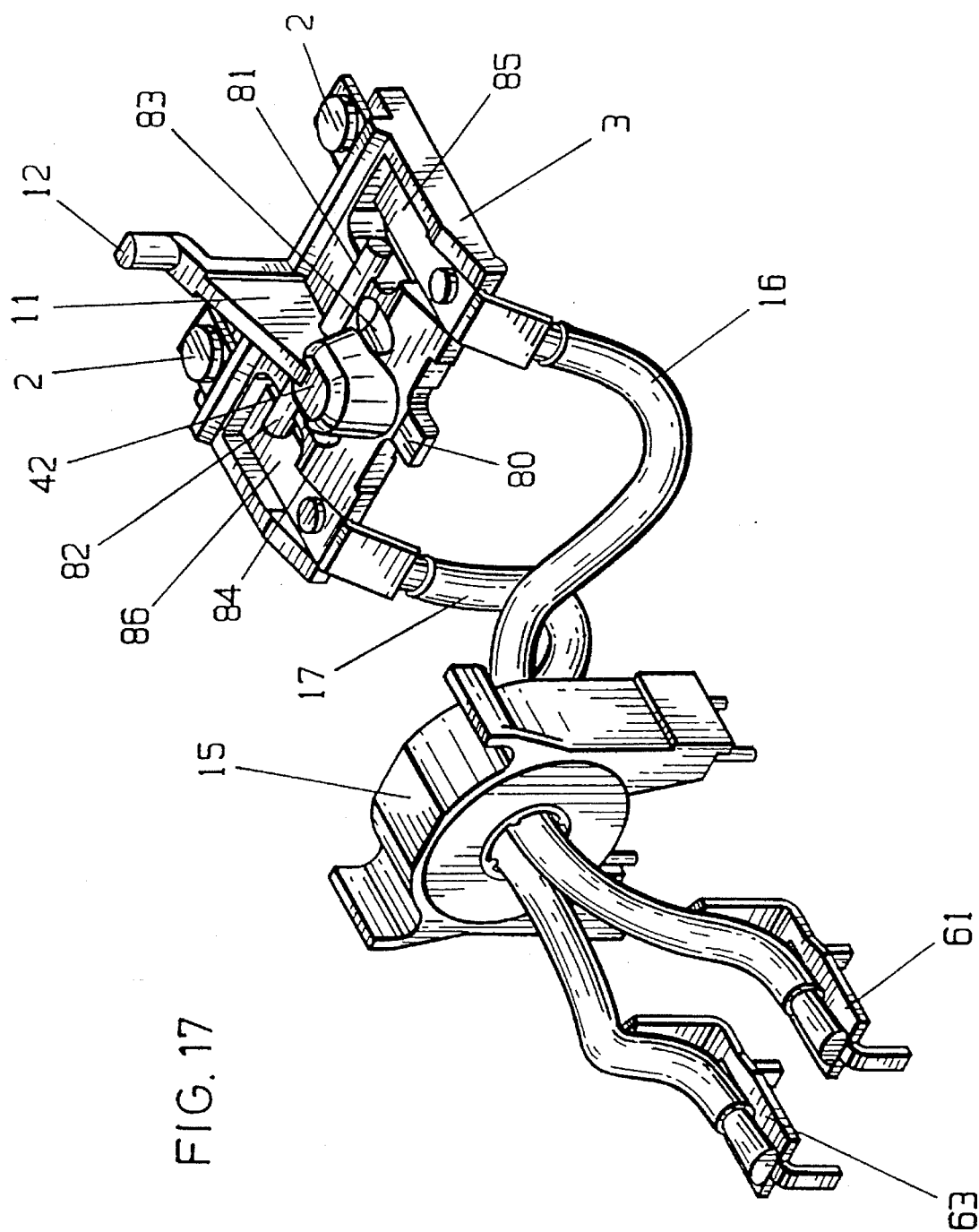
FIG. 17 is an isometric view of the lever assembly and a differential transformer in the preferred RCD.

Referring to FIG. 17 the lever or carrier 3 and differential transformer 15 are shown separated from the RCD. The assembly supports movable contacts 2 and plates 85, 86 through which the contacts are connected to conductors 16, 17. Indicator arm 11 and flag 12 are centrally placed between axles 81, 82 which engage fulcrum 8 in FIGS. 10 and 12. Extension 42 is an inverted pocket which engages one end of spring 9 in FIGS. 11 and 13. When the RCD is being set, rod 101 from button 10, also in FIGS. 11 and 13, is pushed down so that two branches (not shown) engage dimples 83, 84. This depresses the entire lever against spring 9 and allows end 80 to engage fulcrum 4 provided the solenoid is energised.

FIGS. 12 and 17 also show a third fulcrum means 150 as a protrusion on one end of lever or carrier 3 opposite the moveable contacts 2. Contacts 1 and 2 are occasionally tack welded together by a current surge and may be forced apart by the manual reset button 10. On depressing the button as shown in FIG. 5 the protrusion 150 eventually meets the casing 52 shown in FIG. 10 and 12, and acts as a stop or pivot point for further force applied to the lever or carrier 3 through rod 101 to act on the joined contacts. A considerable manual force may thereby be applied to break the tack weld and open the contacts if necessary.

FIG. 18 shows a second control circuit which could be used with a second preferred embodiment of the switch mechanism in FIGS. 1 to 8. Many of the circuit components are identical with those shown in FIG. 9 and need not be described again. However, the function of the circuit is different in that solenoid 6 is now normally de-energised when the contacts 1 and 2 are closed and is only briefly energised to activate the plunger assembly to eject pin 7b when a fault condition is detected.

Power is supplied to the circuit by a full wave rectifier 35' similarly to rectifier 35 in FIG. 9. Capacitor 33 is charged through resistor 36' and prevents substantial current flowing through the rectifier or through the solenoid. Again, when a signal is detected on pin 1 of IC 20 due to an earth fault, SCR 31 is triggered to permit current to flow through the rectifier. This energises the solenoid 6 which activates the plunger assembly as previously described. Contacts 1 and 2 open removing power from the circuit, de-energising the solenoid 6 and allowing the spring 7c to restore the plunger 7a and pin 7b.

FIG. 19 shows an RCD in cross-section which incorporates the control circuit of FIG. 18. Most of the RCD components are identical to those of FIG. 13 and need not be described again. Contacts 1 and 2 are separated to interrupt current flow to the load. Plunger pin 7b has been ejected to deflect arm 5 when solenoid 6 was energised and tripped in response to detection of an earth fault. The plunger assembly is shown restored within the solenoid 6 after action of spring 7c on block 7d which forms one end of the plunger. Spring 71 operates an arm 5 to maintain the arm in the correct position enabling engagement by the contact carrier 3 with fulcrum 4 as previously described.

What is claimed is:

1. A switch mechanism that is opened in the event of an electrical fault condition, comprising a contact set having a movable contact means supported on a contact carrier, said contact carrier being moveable and being linearly restricted in its movement by a limiting means which guides a locating means on the contact carrier, bias means for applying a force to bias the contact carrier against one or other of two fulcrums about which said contact carrier is respectively pivotable, only one of the fulcrums being operable with the contact carrier at one time and in a manner that movement about a first of said fulcrums causes the contact set to close, and movement about a second of said fulcrums causes the contact set to open, the first fulcrum being movable by an electromechanical means in response to the fault condition to become inoperable, allowing the contact carrier to move and operate about the second fulcrum thereby opening the contact set, the contact carrier being movable by a manual reset means so that under a no fault condition the second fulcrum becomes inoperable and the contact carrier moves to operate about the first fulcrum thereby closing the contact set.

2. A switch mechanism according to claim 1, wherein the electromechanical means comprises a solenoid and a plunger assembly, the plunger assembly operating to move the first fulcrum to become inoperable in response to the fault condition, and the plunger assembly then being restored by movement of the contact carrier about the second fulcrum during opening of the contact set.

3. A switch mechanism according to claim 2 wherein the first fulcrum position is on a movable arm having an extension upon which the contact carrier acts to restore the plunger.

4. A switch mechanism according to claim 1 wherein the manual reset means exerts a force on the contact carrier between the two fulcrum positions.

5. A switch mechanism according to claim 1 wherein an indicator is mounted on the contact carrier so that an open or closed state of the contact set is apparent.

6. A switch mechanism according to claim 1, wherein said manual reset means is separate from each of said fulcrums.

7. A residual current device incorporating a switch mechanism according to claim 1.

8. A residual current device comprising an earth fault detection circuit, and a switch mechanism in which a contact set has a moveable contact carried on a contact carrier; wherein a manual reset means is operable to displace the contact carrier to a position from which the contact carrier can pivot and close the contact set in the absence of an earth fault, or, should the contacts become tack welded together, to a position from which an increasing manual force can be applied through the manual reset means to pivot the contact carrier and break the contacts apart, said switch mechanism including a stop against which a portion of the contact carrier abuts when displaced by the manual reset means to form a lever system when breaking the contacts apart with the manual reset means acting on the contact carrier between an end portion which abuts the stop and an end portion which carries the moveable contact.

9. A residual current device having an earth fault detection circuit and switch mechanism which opens in the event of an earth fault, including:

a contact set having fixed and moveable contacts, a contact carrier which carries the moveable contacts, a locating means on the contact carrier, and a fixed limiting means which guides the locating means to restrict movement of the contact carrier, a fixed fulcrum towards and about which the contact carrier is biased and is pivotable during opening of the contacts, manual reset means which pushes the contact carrier away from the fixed fulcrum, and can act directly on the contact carrier to force the contacts apart should they become welded together, a moveable fulcrum towards and about which the contact carrier is biased and is pivotable during closing of the contacts, and electromechanical means which releases the moveable fulcrum form the contact carrier during a fault condition to open the contacts.

10. A device according to claim 9, further including stop means against which one end of the contact carrier abuts to provide a third fulcrum when using the manual reset means to apply a force to the contact carrier which is pivoted about the third fulcrum to break any tack weld and open the contacts.

11. A residual current device comprising an earth fault detection circuit, and a switch mechanism in which a contact set has a moveable contact carried on a contact carrier; wherein an electromechanical means is tripped by the detection circuit causing the contact carrier to pivot and open the contact set in the event of an earth fault, and the electromechanical means is then stored by movement of the contact carrier and means associated therewith while the contact set continues to open said electromechanical means comprising a solenoid and a plunger assembly including a plunger acting on the switch mechanism in response to an earth fault and then being restored in the solenoid assisted by a reaction of the switch mechanism as the contact set opens.

12. A residual current device having an earth fault detection circuit and switch mechanism that opens in the event of an earth fault including:

a contact set having fixed and moveable contacts, a contact carrier which carries the moveable contacts, said contact carrier being movable and being linearly restricted in its movement by a limiting means which guides a locating means on the contact carrier, bias means for applying a force to bias the contact carrier against one or other of two fulcrums about which said contact carrier is respectively pivotable, a first fulcrum towards and about which the contact carrier is biased and is pivotable during closing of the contacts, a second fulcrum towards and about which the contact carrier is biased and is pivotable during opening of the contacts, manual reset means which moves the contact carrier into a position to engage the first fulcrum during closing of the contacts, and electromechanical means which is tripped by detection of an earth fault to displace the first fulcrum away from the contact carrier and is then assisted in moving to the untripped position by movement of the contact carrier in relation to the second fulcrum during opening of the contacts.

13. A device according to claim 12, wherein the electromechanical means comprises a solenoid and plunger assembly, with the plunger assembly operable by extension to displace the first fulcrum, and wherein the first fulcrum is carried on a moveable arm having an extension upon which the contact carrier acts to assist plunger assembly restoration.

14. A switch mechanism that is opened in the event of an electrical fault condition comprising a contact set having a moveable contact means supported on a contact carrier, said contact carrier being moveable and being linearly restricted in its movement by a limiting means which guides a locating means on the contact carrier, bias means for applying a force to bias the contact carrier against one or other of two position control means in a manner that movement about the second position control means causes the contact set to open, said first position control means being moveable by an electromechanical means in response to a fault condition to allow engagement with the second position control means to open the contact set with the electromechanical means also being assisted to move to the untripped position by movement of the contact carrier about the second position control means, the contact carrier being moveable by a manual reset means so that under a no fault condition the contact carrier moves to operate about the first position control means thereby closing the contact set.

15. A switch mechanism according to claim 1, wherein the second fulcrum is formed by abutment between the locating means on the contact carrier and the limiting means, at an end point of the linearly restricted movement of the contact carrier.

16. A switch mechanism according to claim 1, wherein the limiting means comprises a slot and the locating means comprises a protrusion on the contact carrier which moves within the slot.

17. A switch mechanism according to claim 16, wherein one end of the slot is closed and the second fulcrum is formed by abutment of the protrusion with said closed end of the slot.

18. A switch mechanism according to claim 2, wherein the first fulcrum is provided on a moveable arm which is separated from the plunger assembly, to provide a gap across which the plunger is ejected towards the moveable arm in response to the fault condition.

* * * * *